Figure 1:
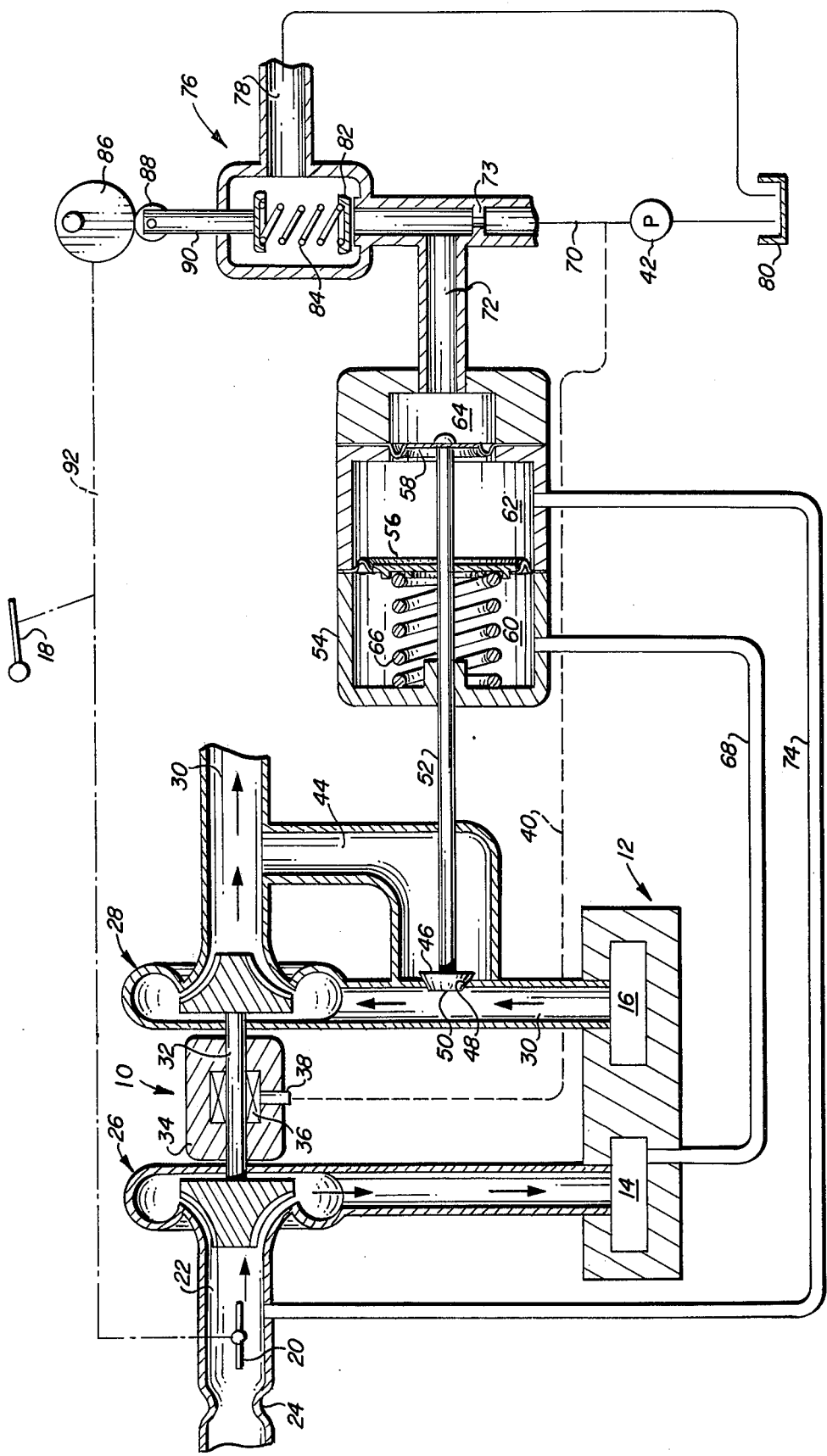

United States Patent [19]

McInerney

[11] 4,005,578

[45] Feb. 1, 1977

[54] METHOD AND APPARATUS FOR TURBOCHARGER CONTROL

[75] Inventor: Charles E. McInerney, Torrance, Calif.

[73] Assignee: The Garrett Corporation, Los Angeles, Calif.

[22] Filed: Mar. 31, 1975

[21] Appl. No.: 564,005

[52] U.S. Cl. .................................. 60/602; 60/605; 123/119 CD

[51] Int. Cl.² .................... F02D 23/00; F02B 33/44

[58] Field of Search ............ 60/602, 605, 598, 615; 123/119 CE, 119 CD

[56] References Cited
UNITED STATES PATENTS

| | | |
|---|---|---|
| 2,024,202 | 12/1935 | Berger .......................... 60/602 X |
| 3,035,408 | 5/1962 | Silver ............................ 60/602 |
| 3,104,520 | 9/1963 | Cazier et al. ................. 60/602 |
| 3,195,805 | 7/1965 | Cholvin et al. ............... 60/602 X |
| 3,270,495 | 9/1966 | Connor ......................... 60/602 |
| 3,389,553 | 6/1968 | Hardy ........................... 60/602 X |
| 3,559,397 | 2/1971 | Navarro ........................ 60/602 |

Primary Examiner—Ronald H. Lazarus
Attorney, Agent, or Firm—James W. McFarland; Albert J. Miller

[57] ABSTRACT

Method and apparatus for controlling intake manifold pressure of a turbocharged internal combustion engine as a function of engine throttle position.

20 Claims, 2 Drawing Figures

METHOD AND APPARATUS FOR TURBOCHARGER CONTROL

This invention relates to an improved control system for turbochargers utilized in conjunction with internal combustion engines.

Turbochargers for internal combustion engines utilized in vehicles normally include a compressor impeller that compresses the air gas flow delivered to the intake manifold of the engine. In gasoline engines the gas flow is normally an air fuel mixture, while in diesel and stratified charge engines the gas flow is only air. The compressor is driven by a turbine which, in turn, is driven by exhaust gas flow from the engine exhaust manifold.

In vehicle engines maximum torque is required during maximum acceleration at lower engine speeds. To provide this, the turbocharger is sized to produce high turbine speeds at low engine speeds. As a result, the turbocharger is overdriven in cruising conditions, supplying excess airflow in the case of a diesel engine, and acting against the actions of the throttle of a gasoline engine which, at part throttle-cruise condition, is restricting gas flow to the engine. In both cases, engine efficiency is reduced in cruise condition. It is thus desirable to control turbocharger operation to prevent this inefficient over drive at part throttle. In many instances control of turbocharger speed is provided by a waste gate valve which can be opened to divert exhaust gas flow from passing through the turbine and thus lower turbine speed.

It is a primary object of the present invention to provide improved method and apparatus for turbocharger control which controls intake manifold pressure and gas flow thereto directly in relation to the torque desired from the engine.

More particularly, it is an object of the invention to provide a member for regulating exhaust gas flow to the turbocharger turbine and a throttle regulated pressure acting on the member to increase turbine speed in direct opposition to a force exerted on the member by intake manifold pressure.

Another important object of the invention is to provide such a turbocharger control system which is not normally affected by variations in exhaust gas pressure, and yet imposes minimal effort forces on the throttle control of the engine.

In summary, the invention determines the brake mean effective pressure (BMEP) or torque desired by sensing accelerator pedal position. The sensed power requirement is transformed to a corresponding hydraulic pressure acting directly upon a waste gate valve tending to close the latter to increase intake manifold pressure. Intake manifold pressure, however, exerts a pneumatic force directly upon the valve in opposition to the hydraulic force. In response to these opposing forces the waste gate valve moves to vary turbine speed and thus create an intake manifold pressure and gas flow thereto consistent with the BMEP level desired. In all operating conditions of the engine, therefore, efficiency reducing turbocharger over drive is prevented.

Figure 2:
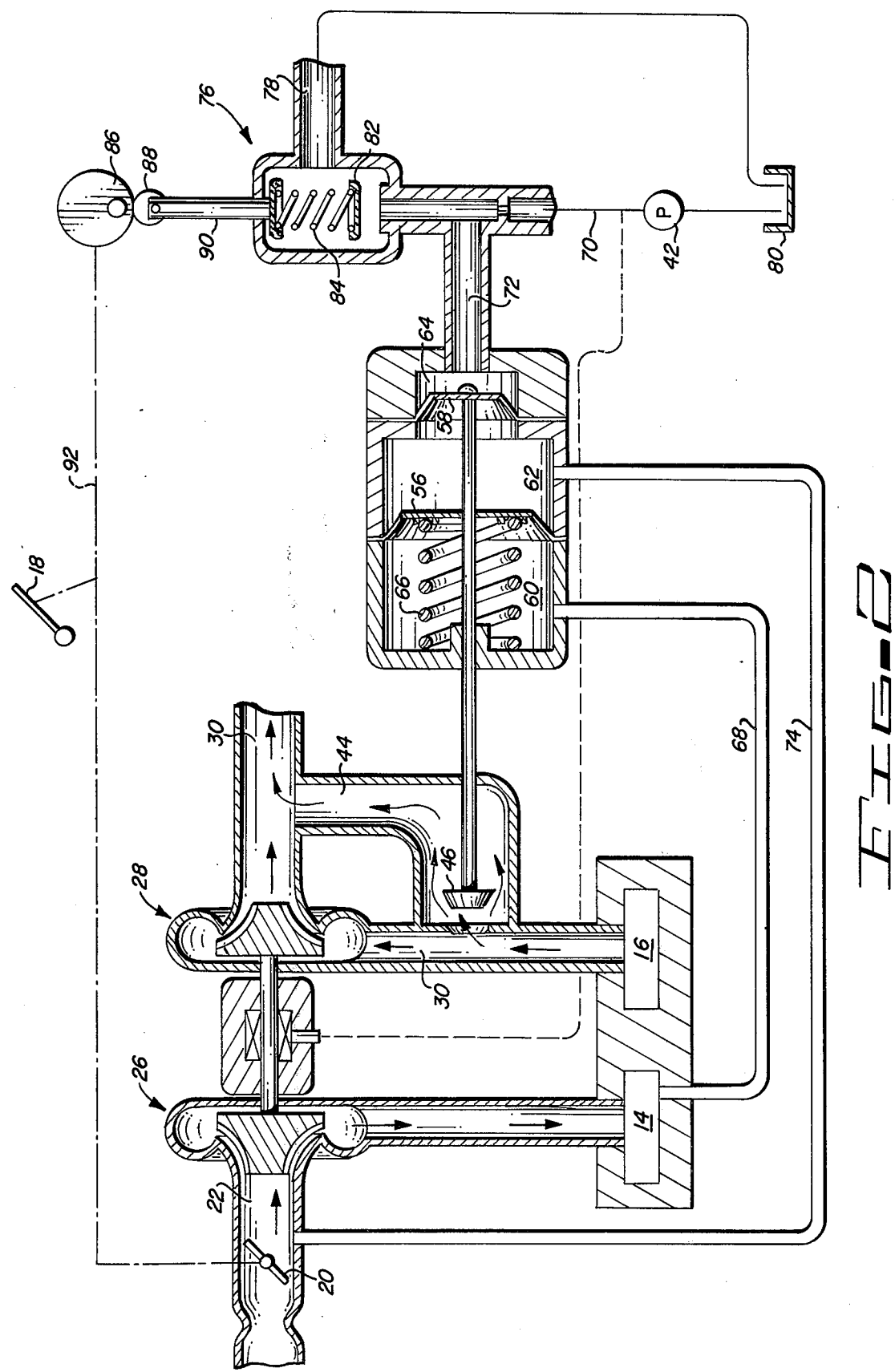

These and other objects and advantages of the present invention are specifically set forth in or will become apparent from the following detailed description of a preferred embodiment of the invention when read in conjunction with the accompanying drawings, wherein:

FIG. 1 is a partially diagrammatic cross-sectional representation of a preferred form of the invention operating in maximum power conditions; and FIG. 2 is a view similar to FIG. 1 but showing the invention operating in part throttle conditions.

Referring now to the drawings there is illustrated a turbocharger generally designated by the numeral 10 in association with a carbureted, gasoline internal combustion engine 12. The invention is equally useful, however, with diesel, stratified charge or other types of internal combustion engines.

Engine 12 conventionally includes gas intake and exhaust manifolds 14, 16, and an accelerator pedal 18 operably connected to a throttle 20 in the form of a butterfly valve disposed in an inlet passage 22 carrying gas flow to the intake manifold. Throttle 20 is downstream of a venturi restriction 24 and a carburetor (not shown) which delivers an air fuel mixture to passage 22.

Turbocharger 10 includes a compressor impeller 26 in the inlet passage 22 which delivers the air fuel mixture to the intake manifold at a pressure determined by the speed of the compressor. A turbine 28 is disposed in a passage 30 communicating with exhaust manifold 16 to be driven by exhaust gas flow from the engine. Turbine 28 drives compressor 26 through an appropriate shaft 32 supported in a housing 34 by an oil-lubricated bearing system 36 fed through a duct 38 and conduit 40 with oil from a source of pressurized hydraulic fluid 42. Typically source 42 may be the engine oil lubrication pump.

Apparatus is provided to control compressor speed and thus intake manifold pressure by regulating exhaust gas flow through turbine 28. To this end, a bypass passage 44 communicates with exhaust passage 30 in parallel relationship to turbine 28. A member in the form of a movable valve 46 is disposed in passage 44 so as to close off or variably restrict exhaust gas flow from passage 30 into bypass 44 through an opening 48. The valve depicted has a forward face area 50 exposed to exhaust gas pressure, and a rearwardly extending stem 52 that is received within a housing 54. Housing 54 may be integral with housing 34.

Within housing 54 are wall means in the form of first and second movable diaphragm walls 56, 58 dividing the interior of the housing into three separate, noncommunicating pressure chambers 60, 62, and 64. Stem 52 is rigidly affixed to both walls 56 and 58. Biasing means in the form of a helical coil compression spring 66 is disposed in chamber 60 to engage wall 56 and urge valve 46 to move toward its open position shown in FIG. 2.

A first conduit means 68 interconnecting chamber 60 with the intake manifold constitutes a first sensing means for sensing intake manifold pressure. The corresponding pressure developed in chamber 60 exerts a pneumatic force upon the face area of wall 56 exposed to chamber 60, causing wall 60 to tend to move rightwardly toward the FIG. 2 position and open valve 46. Similarly a second conduit means 70 interconnects chamber 64 of the housing with pump 42 by way of an inlet duct 72 disposed in parallel flow relationship to lubrication conduit 40. A fixed restriction 73 in inlet duct 72 prevents starvation of oil lubrication flow to the remainder of the engine. Thus, fluid pressure developed in chamber 64 exerts a hydraulic force on the face area of wall 58 exposed to chamber 64, causing wall 58 to tend to move leftwardly toward the FIG. 1 position wherein valve 46 is closed. A third conduit means 74 interconnects intermediate chamber 62 with inlet duct 22 downstream of the throttle 20, such that compressor inlet pressure acts upon both walls 56 and 58 to produce a net force urging valve 46 leftwardly due to the substantially larger area of wall 56 exposed to chamber 62.

Control means generally designated by the numeral 76 are disposed in a return duct portion 78 of conduit means 72 leading to a low pressure oil reservoir 80. Control means 76 are effective to regulate the hydraulic pressure developed in chamber 64, and to this end includes a variable flow restrictor or valve 82 for variably restricting fluid flow through return duct 78. A resilient biasing means, spring 84, urges restrictor 82 toward a position blocking flow through duct 78 to increase chamber 64 pressure.

To vary the force of spring 84, linkage including an offset cam 86, a follower 88, a rod 90 engaging spring 84 and other appropriate linkage illustrated by dashed lines 92 interconnects the throttle with spring 84. This linkage thus provides means for sensing the torque desired to be developed by the engine as established by throttle position, and in response, the control means are operable to vary pressure in chamber 64 and the hydraulic force exerted on valve 46. As the accelerator pedal 18 is depressed further to open throttle 18, cam 86 urges rod 90 downwardly to increase the force of spring 84 and thus increase hydraulic pressure in chamber 64. Similarly, throttle closing movement as shown in FIG. 2 rotates cam 86 so that rod 90 withdraws to reduce spring force and chamber 64 pressure.

In operation, maximum torque for vehicle acceleration is produced by depressing the accelerator pedal 18 to open throttle 20 and increase the hydraulic pressure in chamber 64 to move valve 46 to its FIG. 1 closed position. Maximum flow through the turbine results, thereby providing conditions for development of maximum pressure in the intake manifold. At intermediate positions of pedal 18 and throttle 20, corresponding less hydraulic closing force is exerted on valve 46. As intake manifold pressure increases the pneumatic force exerted on the valve by pressure in chamber 60 also increases. Being thus positioned by the difference between the hydraulic force and the sum of the pneumatic force and force of spring 66 exerted on it, valve 46 moves to control bypass flow through passage 44 and thus compressor speed so as to control intake manifold pressure directly in relation to torque desired from the engine as sensed by throttle position. As more power is desired, greater intake manifold pressure is allowed to be developed.

Upon reaching cruise condition the torque required to maintain a constant vehicle speed is substantially less than the maximum torque required for acceleration. Thus, the throttle is moved to a more closed position as shown in FIG. 2. In relation to throttle position, control means 76 reduce hydraulic pressure in chamber 64 to allow intake manifold pressure in chamber 60 to open valve 46 and reduce compressor speed to a level such that gas flow to intake manifold 14 is consistent with engine power required. Accordingly, inefficient excess gas flow at part throttle is eliminated.

The present invention achieves excellent control over intake manifold pressure to produce maximum efficiency at all operating conditions of the engine. Better control than provided by prior art systems is achieved by utilization of the throttle regulated hydraulic pressure and by the arrangement illustrated wherein both the hydraulic and pneumatic pressures act directly upon the valve 46. To minimize the effect of exhaust gas pressure upon control of intake manifold pressure, the area of wall 56 exposed to chamber 60 is substantially larger than the valve face area 50 exposed to exhaust gas pressure. Accordingly, the force exerted by intake manifold pressure upon the valve is normally relatively high. Yet by utilization of the hydraulic pressure regulation offered by control 76, the effort force upon the accelerator pedal is not excessive. Accordingly, there is provided a control system normally insensitive to exhaust gas pressure, capable of achieving excellent control over intake manifold pressure as a direct function of throttle position, but yet no excessive effort forces are exerted upon the accelerator pedal.

During sudden deceleration, quick closing of throttle 20 can create lower than ambient pressure conditions in the intake manifold and chamber 60. Essentially the same pressure, however, is sensed in chamber 62 to prevent injurious reversal of the convolution of the diaphragm of wall 56. The life of the diaphragm is accordingly enhanced.

It will thus be apparent from the foregoing that there is provided a method of controlling intake manifold pressure directly in relation to throttle control which is positionable to vary power developed by the engine. Regulation of exhaust gas flow through the turbine in response to movement of valve 46 effects regulation of intake manifold pressure. In relation to sensed intake manifold pressure and throttle position, pneumatic and hydraulic forces are respectively produced to act oppositely on the member so that the latter moves substantially in response to the difference in these forces to maintain an intake manifold pressure determined by throttle position.

While the invention has been illustrated with the compressor 26 disposed downstream of the carburetor, it is equally useful in arrangements where the compressor is upstream of the carburetor. Also, the invention may be incorporated in a similar manner in diesel or stratified charge engines with the same increase in efficiency by elimination of excess air flow at part throttle conditions. The linkage 92 in the latter engines would, of course, be interconnected with the fuel rack or throttle instead of the air-fuel mixture throttle of carbureted gasoline engines. The present invention may also be utilized with types of members other than waste gate valve 46 that function to control compressor speed, such as members which are movable to effectively vary turbine inlet nozzle area.

These and other modifications and alterations will be apparent to those skilled in the art. Accordingly, the foregoing detailed description of a preferred embodiment of the invention is to be considered exemplary in nature and not as limiting to the scope and spirit of the invention as set forth in the appended claims.

Having thus described the invention with sufficient clarity that those skilled in the art may make and use it, what is claimed and desired to be secured by Letters Patent is:

1. In combination with an internal combustion engine having an intake manifold, a turbocharger driven by flow of exhaust gases from said engine, and a throttle positionable to vary power developed by the engine, apparatus for controlling intake manifold pressure comprising:

a member exposed to said exhaust gas flow and movable to regulate exhaust gas flow through said turbocharger to vary said intake manifold pressure;

first sensing means for sensing said intake manifold pressure;

means responsive to said first sensing means and operably associated with said member for exerting a pneumatic force thereon in relation to intake manifold pressure, said pneumatic force urging said member to move in a direction decreasing intake manifold pressure;

second sensing means for sensing said throttle position;

a source of pressurized hydraulic fluid; and means responsive to said second sensing means and operably associated with said source of fluid and said member for exerting a hydraulic force thereon in relation to throttle position, said hydraulic force opposing said pneumatic force and urging said member to move in an opposite direction increasing intake manifold pressure whereby said member moves substantially in response to the difference between said hydraulic and pneumatic forces to regulate said intake manifold pressure in relation to said throttle position.

2. A combination as set forth in claim 1, wherein said exhaust gas flow exerts a force in said member, said member disposed relative to said exhaust gas flow whereby said force exerted by the latter is normally substantially less than said difference between the pneumatic and hydraulic forces.

3. A combination as set forth in claim 2, further including biasing means engaging said member for exerting a force assisting said pneumatic force in urging said member to move in said direction decreasing intake manifold pressure, whereby said member moves in response to the difference between said hydraulic force and the sum of said pneumatic and biasing forces.

4. A method of controlling intake manifold pressure in a turbo-charged internal combustion engine having a turbocharger driven by flow of exhaust gases from the engine and a throttle positionable to vary power developed by the engine, comprising the steps of:

regulating exhaust gas flow through said turbocharger to vary said intake manifold pressure by moving a member exposed to said exhaust gas flow;

sensing said intake manifold pressure and said throttle position;

producing a pneumatic force on said member in relation to the sensed intake manifold pressure, said pneumatic force urging said member to move in a direction decreasing intake manifold pressure; and producing a hydraulic force on said member in relation to the sensed throttle position, said hydraulic force opposing said pneumatic force and urging said member to move in a direction increasing intake manifold pressure, whereby said member moves substantially in response to the difference between said pneumatic and hydraulic forces to regulate said intake manifold pressure in relation to said throttle position.

5. A method as set forth in claim 4, wherein said exhaust gas flow exerts a force on said member, said difference between the pneumatic and hydraulic forces being normally substantially greater than said force exerted by the exhaust gas flow.

6. In combination with a turbocharger, an internal combustion engine having an intake manifold, an exhaust manifold, a throttle positionable to vary power developed by the engine, and a source of fluid under pressure, said turbocharger comprising:

a turbine operably associated with said exhaust manifold be driven by exhaust gas flow from the engine;

a compressor driven by said turbine and having a gas inlet passage, said compressor operably associated with said intake manifold to deliver gas flow thereto at a pressure which varies with the speed of said compressor;

a member exposed to said exhaust gas flow and movable to vary exhaust gas flow through said turbine to thereby regulate compressor speed and pressure of gas flow to the intake manifold;

a housing receiving at least a portion of said member;

first conduit means communicating with said intake manifold and said housing whereby the pressure developed in said intake manifold acts upon said member to urge the latter to move in a direction reducing compressor speed and pressure of gas flow to the intake manifold;

second conduit means communicating with said source of fluid and said housing whereby fluid pressure in said housing acts upon said member to urge the latter to move in an opposite direction increasing compressor speed and pressure of gas flow to the intake manifold; and fluid pressure control means operably associated with said second conduit means and said throttle for regulating said fluid pressure acting upon said member in relation to the position of said throttle, whereby said pressure of gas flow to the intake manifold is regulated in relation to said throttle position.

7. A combination as set forth in claim 6, wherein said exhaust gas exerts a force on said member urging the latter to move in said direction reducing pressure of gas flow to the intake manifold, said intake manifold pressure normally exerting a substantially greater force on said member than said force exerted by the exhaust gas.

8. A combination as set forth in claim 6, further including means biasing said member in said opposite direction.

9. A combination as set forth in claim 6, further including third conduit means communicating with said compressor inlet passage and said housing whereby the pressure developed in said compressor inlet duct urges said member to move in said opposite direction.

10. A combination as set forth in claim 6, wherein said control means comprises variable orifice means associated with said second conduit means and operably controlled by said throttle to vary said fluid pressure acting upon said member.

11. A combination as set forth in claim 10, wherein said second conduit means includes a fluid inlet duct communicating said source of fluid with said housing, and a return duct for carrying fluid flow from said housing to a low pressure return, said variable orifice means including a restrictor disposed in said return duct, and resilient biasing means producing a biasing force urging said restrictor in a direction increasing restriction through said return duct to increase said fluid pressure acting upon the member.

12. A combination as set forth in claim 11, wherein said control means further includes linkage extending between said throttle and said resilient biasing means whereby said biasing force and return flow restriction are varied in accordance with throttle position.

13. A combination as set forth in claim 12, further including a flow restriction in said inlet duct.

14. A combination as set forth in claim 13, further including a rotatable shaft interconnecting said turbine and said compressor, a bearing on said shaft, and a lubricating duct between said source of fluid and said bearing for lubricating the latter, said lubricating duct and inlet duct disposed in parallel flow relationship relative to said source of fluid.

15. A combination as set forth in claim 6, further including wall means movable in said housing and secured to said member, said wall means defining first and second chambers in said housing respectively communicating with said first and second conduit means whereby said fluid pressure is developed in said second chamber to exert a force on said wall means directly opposing a force on said wall means exerted by said intake manifold pressure in said first chamber.

16. A combination as set forth in claim 15, further including a bypass passage for carrying exhaust gas flow from said exhaust manifold in bypass relationship to said turbine, said member including a valve in said bypass passage movable to regulate said bypass gas flow through said bypass passage and thereby regulate exhaust gas flow through said turbine, said valve having an area exposed to pressure of said exhaust gas flow and said wall means having an area exposed to said intake manifold pressure in said first chamber, said area of the wall means being substantially greater than said area of the valve.

17. A combination as set forth in claim 16, wherein said member further includes stem means interconnecting said valve and said wall means.

18. A combination as set forth in claim 15, wherein said wall means include a first wall having an area exposed to said intake manifold pressure in said first chamber, a second wall having an area exposed to said fluid pressure developed in said second chamber, said area of the first wall being substantially greater than said area of the second wall.

19. A combination as set forth in claim 18, wherein said first and second walls define a third chamber in said housing intermediate said first and second chambers, and further comprising third conduit means communicating said compressor inlet passage with said third chamber, whereby compressor inlet pressure developed in said third chamber exerts a force on said member opposing said force exerted by said intake manifold pressure in the first chamber.

20. A combination as set forth in claim 19, wherein said throttle is disposed in said compressor inlet passage upstream of said third conduit means, said throttle being operable to control gas flow to said compressor.

* * * * *